(12) United States Patent
Campbell

(10) Patent No.: US 8,967,032 B2
(45) Date of Patent: Mar. 3, 2015

(54) SMART-STORE EMULATION UNIT

(75) Inventor: Edward H. Campbell, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 371 days.

(21) Appl. No.: 13/370,195

(22) Filed: Feb. 9, 2012

(65) Prior Publication Data

US 2013/0211813 A1     Aug. 15, 2013

(51) Int. Cl.
*F41F 3/06* (2006.01)
*F41G 7/00* (2006.01)
*G09B 9/00* (2006.01)

(52) U.S. Cl.
CPC ............... *F41G 7/006* (2013.01); *G09B 9/003* (2013.01)
USPC ..................... 89/41.01; 703/8; 703/4; 434/12

(58) Field of Classification Search
None
See application file for complete search history.

(56) References Cited

U.S. PATENT DOCUMENTS

| | | | | |
|---|---|---|---|---|
| 4,541,804 A | * | 9/1985 | Armour et al. | 434/15 |
| 5,228,854 A | * | 7/1993 | Eldridge | 434/11 |
| 5,378,155 A | * | 1/1995 | Eldridge | 434/11 |
| 5,414,347 A | * | 5/1995 | Monk et al. | 324/73.1 |
| 5,591,031 A | * | 1/1997 | Monk et al. | 434/14 |
| 5,614,896 A | * | 3/1997 | Monk et al. | 340/945 |
| 5,624,264 A | * | 4/1997 | Houlberg | 434/12 |
| 6,122,569 A | * | 9/2000 | Ebert et al. | 701/3 |
| 6,615,116 B2 | | 9/2003 | Ebert et al. | |
| 6,941,850 B1 | * | 9/2005 | McMahon | 89/1.811 |
| 7,137,599 B1 | * | 11/2006 | Sitzmann et al. | 244/137.4 |
| 7,152,134 B2 | * | 12/2006 | Kinstler | 710/315 |
| 7,802,048 B2 | | 9/2010 | Campbell | |
| 2003/0033059 A1 | | 2/2003 | Ebert et al. | |
| 2004/0205285 A1 | | 10/2004 | Kinstler | |
| 2005/0183570 A1 | | 8/2005 | McMahon | |
| 2010/0021789 A1 | | 1/2010 | Terada et al. | |
| 2010/0070674 A1 | * | 3/2010 | Campbell | 710/315 |
| 2010/0209880 A1 | * | 8/2010 | Leonard et al. | 434/12 |

FOREIGN PATENT DOCUMENTS

| | | |
|---|---|---|
| EP | 1001242 | 5/2000 |
| WO | 2005106378 | 11/2005 |

OTHER PUBLICATIONS

Department of Defense Interface Standard Aircraft/Store Electrical Interconnection System MIL STD 1760D [2003].*
Reilly, D. J. "Unitary Joint Standoff Captive Air Training Missile Avionics Design Through Operational Concepts and Functional Requirements Analysis," Thesis, Naval Post Graduate School, Monterey, California, Mar. 1996.*
Y. Gindin, E. Darom, "Simulation Tools Within an Aircraft Upgrade Program A Cost Effective Approach," AIAA Meeting Papers on Disc, 1996, pp. 426-435.*

* cited by examiner

*Primary Examiner* — Kamini S Shah
*Assistant Examiner* — David M Rogers
(74) *Attorney, Agent, or Firm* — Eric A. Gifford

(57) ABSTRACT

A smart-store emulation unit is provided for use on-board a weapon platform in place of the physical presence of a smart-store. The emulation unit may be used for operator training on or testing of the smart-store on-board an operational weapon platform such as an aircraft, tank or ship.

8 Claims, 10 Drawing Sheets

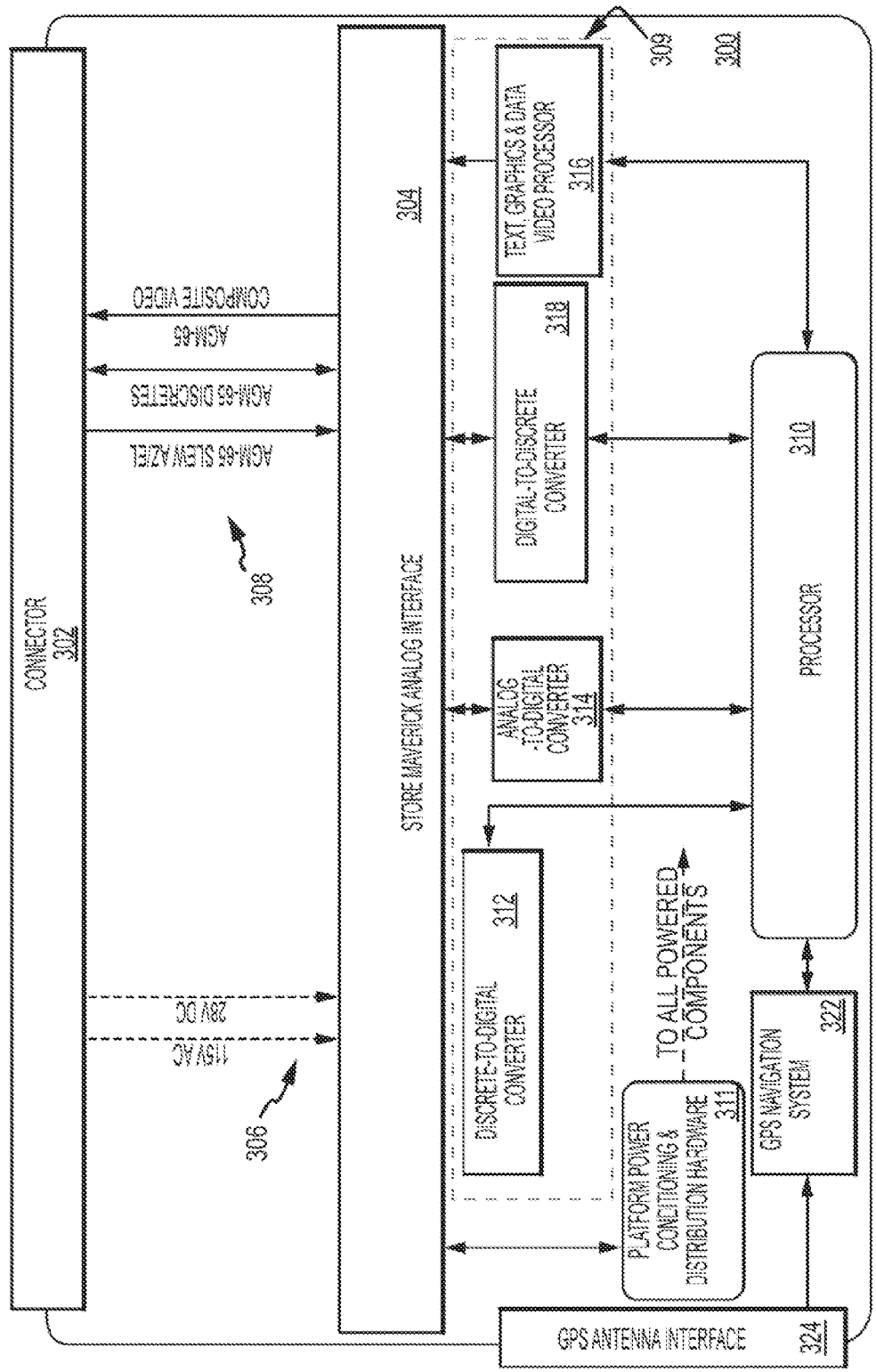

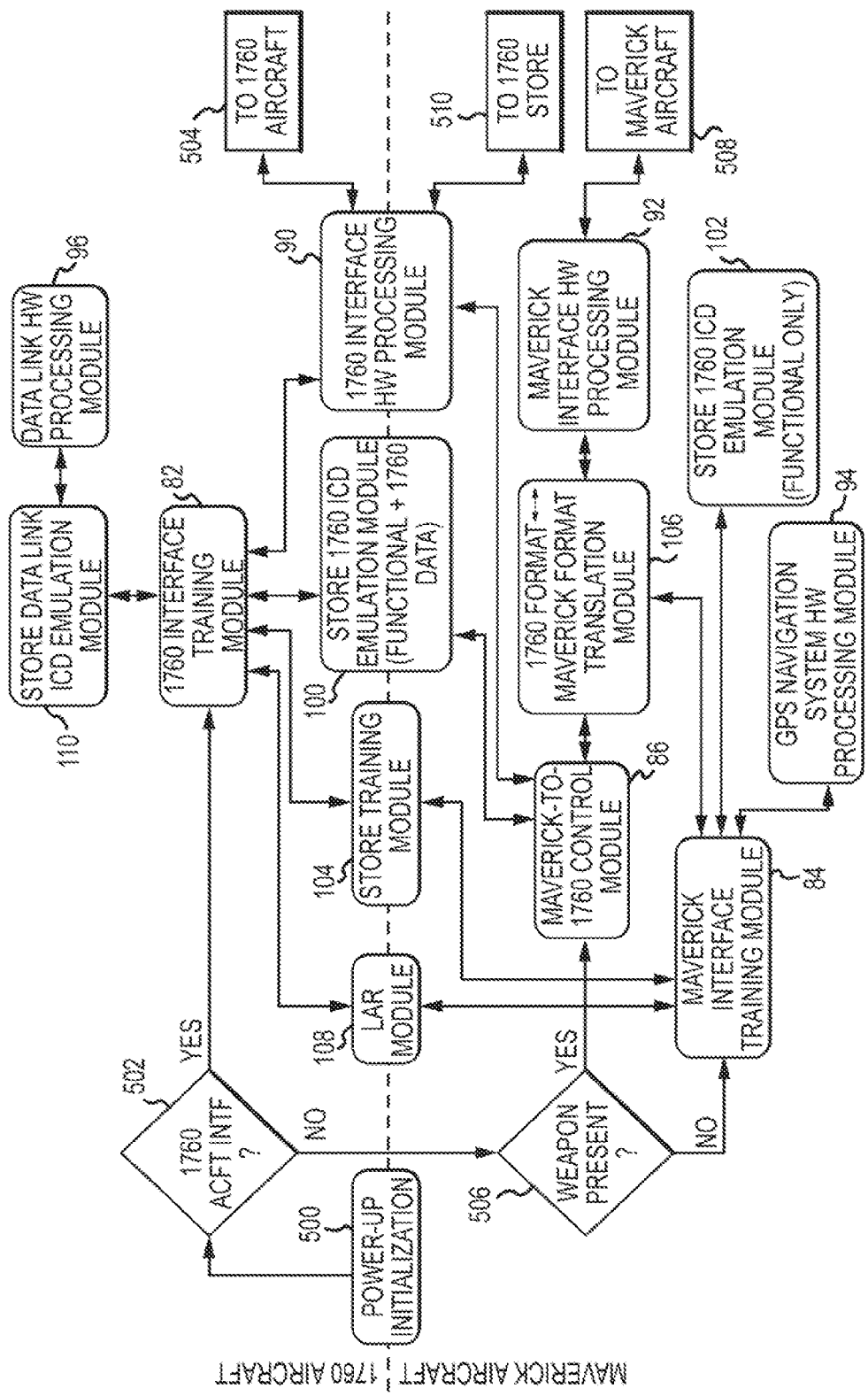

SMART-STORE EMULATION UNIT

BACKGROUND OF THE INVENTION

1. Field of the Invention

This invention relates to smart-stores, and more particularly to a smart-store emulation unit for use on-board a weapon platform in place of the physical presence of a smart-store to conduct operator training on or testing of the smart-store.

2. Description of the Related Art

Aircraft carry and release stores (e.g. bombs, missiles etc.) to engage targets. On older aircraft, with "dumb" stores the pilot simply pressed the "pickle" button on the hands-on throttle and stick (HOTAS) to send a signal via a hardwired cable to the rack or pylon to release the store. On more recent aircraft that carry precision-guided "smart-stores" (e.g. GPS, laser or RF guided) an additional electrical interface provides for bidirectional communication of data between the aircraft and store via a message set over a separate hardwired cable. Other smart-stores include launchers, targeting pods, etc. An Interface Control Document (ICD) defines both the functional behavior of the smart-store and the message traffic to and from the store to effect data transfer via the electrical interface in sufficient detail that the store can be connected to a weapon platform (such as an aircraft) and either control or be controlled by the platform.

U.S. and several foreign designed aircraft built, after the early 1970s such as the A-4, AV-8, F-4, F-15, F-16, F/A-18, F-111 and so on include an AGM-65 ("Maverick") analog interface. The aircraft interface provides discrete signals such as uncage, station select, AGM-65 select, launch, track, and others . . . on discrete input signal lines that change state depending on how the aircrew manipulates the Maverick controls. For example, pressing the Maverick "Track" button, typically located on the HOTAS, momentarily causes the "track" signal to go high. The aircraft interface further provides two variable analog slew signals on analog input signal lines that are used to slew the gimbaled seeker on the store in azimuth and elevation. The store interface receives analog video from the seeker (e.g. infrared sensed imagery or output from a TV/CCD sensor) and transmits the video over a video output signal line where the video can be viewed by the aircrew in the cockpit. The store interface also provides discrete signals an discrete output signal lines such as launcher present, AGM-65 identification MSL ready, etc. to the aircraft.

In the early 1990s, the U.S. Department of Defense promulgated MIL-STD-1760 that defines a digital interface, hardware and software for aircraft and stores. Newly produced tactical aircraft are internally wired with a 1760-compatible data bus for coupling to the MIL-STD-1760 standard store interface. Modern smart weapons such as the Joint Direct Attack Munition (JDAM), Joint Standoff Weapon (JSOW) or ENHANCED PAVEWAY™ bomb are designed to communicate with the aircraft via such an interface to obtain control, monitor and firing information to carry out mission critical operations. The ICD defines the functional behavior and 1760-compliant message traffic of the store.

These modern smart stores such as bombs, missiles and smart projectiles compute and update their Launch Acceptability Region (LAR) to engage a target on the ground or in the air. The LAR defines a region of conditions where a store can be successfully launched to reach a specified target. In the case of a weapon released from an aircraft, these launch conditions usually take into account real time variables like the range to the target, the speed, altitude and attitude of the aircraft, and the capabilities of the weapon itself under those conditions. The primary factors that typically limit the launch envelope of a store are its kinematic performance and seeker capabilities. The store executes store-specific LAR algorithms (as implemented in store-specific software) to update the LAR. The 1760 interface allows the store to generate and transmit a LAR data message to the aircraft, which in turns generates the LAR display to be viewed by the aircrew in the cockpit.

The overwhelming majority of legacy aircraft in use today lack either the proper hardware and/or software to communicate with modern stores using the store's MIL-STD-1760 interface. Economic and political constraints dictate that the lives of existing aircraft must be extended, making the incorporation of new 1760 stores into existing aircraft highly desirable if not necessary. Integration of new 1760 stores with legacy "Maverick" aircraft or aircraft with no existing interface requires significant hardware and software modifications to the aircraft. Such modifications are both complex and costly to design and implement and may not provide the full functionality of the 1760 store. RAYTHEON COMPANY has developed Munitions Control Units (MCUs) that allow AGM-65 aircraft to control modern 1760 stores (see U.S. patent publication 2010/0217899 and U.S. Pat. No. 7,802, 048) without modification to the aircraft's hardware and software.

Pilots of either modern 1760-compatible aircraft or legacy "Maverick" aircraft must be fully trained on the use of these 1760 smart-stores. Pilot training may be a combination of a full-up simulator that simulates both the aircraft and smart-store, a real aircraft with live smart-stores, and a real aircraft with simulated smart-stores. The latter involves simultation software that is built into the aircraft and is often known as "zero quanitity" training in reference to the lack of a physical smart-store.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a smart-store emulation unit for use on-board a weapon platform in place of the physical presence of a smart-store. The emulation unit may be used for operator training on the smart-store or testing of the smart-store on-board an operational platform such as an aircraft, tank or ship.

In an embodiment, the smart-store emulation unit comprises a first mating connector comprising a plurality of pins for connection to a platform connector and a first interface including power lines and a plurality of signal lines defined on the first connector pins. A digital processor is configured to emulate the smart-store. First I/O hardware between the digital processor and the first interface provides signal conversion and distribution between the digital processor and the first interface power lines and signal lines. The processor executes a store-specific Interface Control Document (ICD) emulation module to mimic the functional behavior of the smart-store in response to operator or platform requests.

For smart-stores such as missiles or guided projectiles launched from the platform to prosecute a target, the processor may execute a Launch Acceptability Region (LAR) module to compute and dynamically update the store's LAR and provide the LAR to the platform. The LAR module executes the same EAR algorithms as the store to generate the same EAR message traffic and LAR results as the store. For certain stores, the store source code may be imported, compiled and executed by the LAR module. The unit may be provided with different ICD and LAR modules for different smart-stores.

In an embodiment, the digital processor is configured to execute a training module that emulates store errors to send error messages to the operator or platform, records platform, operator and emulation unit actions and scores operator performance.

In an embodiment, both the platform and the smart-store comprise a MIL-STD-1760 digital interface. The emulation unit's first interface is the MIL-STD-1760 digital interface and the ICD emulation module supports both the functional behavior and 1760-compliant message traffic of the smart-store. The emulation unit receives coordinates and other real time navigation data from the 1760 platform, in accordance with the store ICD, to update the LAR.

In an embodiment, the platform comprises a Maverick analog interface and the smart-store comprises a MIL-STD-1760 digital interface. The emulation unit's first interface is the Maverick analog interface and the ICD emulation module supports only the functional behavior of the smart-store. The digital processor is configured to execute a bidirectional 1760-to-Maverick digital-to-analog translation module to translate between Maverick and 1760 data formats. The unit further comprises a GPS navigation system to provide coordinates and other real time navigation data to the LAR module.

In an embodiment, the smart-store emulation unit is configured as a multi-purpose unit that can support either training for a 1760 smart-store without the physical presence of the store or control of the 1760 smart-store, both from a Maverick analog platform. The unit is provided with both 1760 and Maverick connectors and 1760 and Maverick I/O hardware. The processor executes the translation module to control the 1760 smart-store if present. For training, the processor executes the LAR and ICD modules (function only to emulate training on the 1760 smart-store. The unit may be further provided with an ICD module (both function and 1760-compliant message traffic) and bidirectional 1760 I/O hardware to function as a training unit for a 1760 digital platform.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 5 is a hardware diagram of a smart-store emulation unit for use with a Maverick platform without the presence of a 1760 smart-store; and FIGS. 6a and 6b are hardware and software schematic diagrams of an embodiment of smart-store emulation unit for use with Maverick or 1760 platforms for training on or control of at 1760 smart-store.

DETAILED DESCRIPTION OF THE INVENTION

Figure 1A:
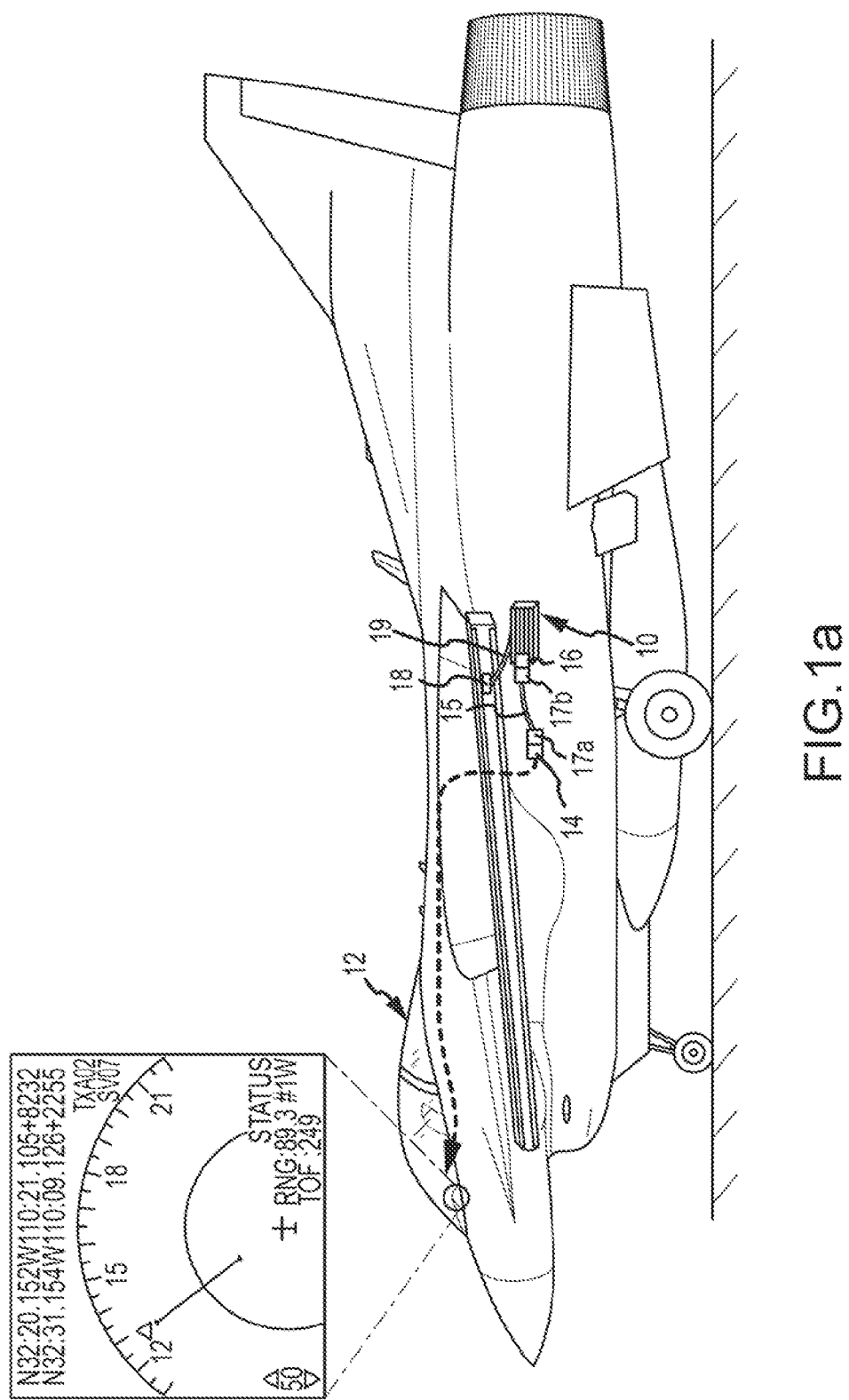
FIGS. 1a and 1b are diagrams of an aircraft outfitted with a smart-store emulation unit for training without the physical presence of a smart-store and for controlling a smart-store, respectively.

The simulation software that is available on certain modern aircraft to run "zero quantity" simulations of the smart-stores accurately models store controls and displays, with the notable exception of the LAR display. The aircraft lack the computational resources to run the LAR algorithms in real-time, and thus rely on simplified models of the LAR, which are typically inadequate. When the store is updated to change its flyout behavior, the aircraft should update its LAR model as well but often does not. Because of the technology involved and the expense of updates, the lifetime of an aircraft design is much longer and more static than that of a smart-store. Thus, the hardware and software processing resources of the aircraft, and any "zero quantity" capability, will always be outpaced by newer store technologies. Furthermore, the legacy "Maverick" aircraft have no "zero quantity" capability to train on modern 1760 stores. Thus existing solutions for smart-store training on a real aircraft without requiring the physical presence of the smart-store are inadequate. Training with a "live" smart store is often undesirable because the store is expensive, heavy and may be subject to a lifetime usage limit on flying hours.

The present invention provides a smart-store emulation unit for use on-board a weapon platform in place of the physical presence of a smart-store. For simplicity and ease of understanding in what follows, we will assume that the operational platform is an aircraft, and that the smart-store is a notional MIL-STD-1760 compliant weapon, unless stated otherwise. The emulation unit may be used for operator training on the smart-store or for testing of the smart-store on-board a weapon platform such as an aircraft, tank or ship. The emulation unit can be used to train operators from either modern 1760 weapon platforms or legacy "Maverick" weapon platforms on the use of modern 1760 smart-stores. For a 1760 weapon platform, the emulation unit executes an ICD emulation module to mimic both the functional behavior and 1760-compliant message traffic of the smart-store. For a Maverick platform, the emulation unit executes an ICD emulation module to mimic only the smart-store functional behavior and executes a translation module to translate the message traffic between the Maverick and 1760 interfaces. From either platform, the emulation unit may run the LAR algorithms imported from the smart-store thus generating the same LAR message traffic and LAR results as the smart-store itself. If available, the emulation unit may run source code for the LAR imported from the smart-store. The emulation unit may inject store errors into the process as a training aid, record the actions of the platform, emulation unit and operator, and possibly score the operator's performance. Because the emulation unit is an "add-on" to the weapon platform, the unit's hardware and software capability can be updated to track the technology evolution of the smart-stores being emulated.

The emulation unit provides either a legacy Maverick aircraft or a modern 1760 aircraft (or future aircraft with a new interface) with the same "look and feel" and capability to train on a 1760 smart-store as if the smart-store were physically present on the aircraft. The emulation unit emulates the smart-store's functional behavior as specified by the store's ICD and communicates with the aircraft interface with signals specified by its ICD without modification to the aircraft's electronics or software. "Emulate" as applied to computers means "to imitate (a particular computer system) by using a software system, often including a microprogram or another computer that enables it to do the same work, run the same programs, etc., as the first." The emulation unit uses a software system implemented on a digital processor in combination with I/O hardware to do the same work, run the same programs as smart-stores, such as smart-stores provided with a MIL-STD-1760 interface, whose functional behavior and message traffic are fully defined by the store's ICD.

As shown in FIG. 1a, a smart-store emulation unit 10 is provided for use on-board a weapon platform such as an aircraft 12 for pilot training, where it substitutes for the physical presence of a smart-store. Aircraft 12 includes an electrical interface, e.g. a Maverick analog interface for a Maverick aircraft and a 1760 digital interface for a 1760 aircraft, that is defined on the pins of a connector 14. Emulation unit 10 includes a mating connector 16. An interface cable 15 including connectors 17a and 1713 at opposing ends may be used to physically connect the aircraft connector 14 to the emulation unit's mating connector 16. Depending on the configuration of the emulation unit, connectors 17a and 17b may have the same connector (e.g. M/M or F/F) or may have different connector (e.g. M/F or F/M). In some configurations the interface cable is not required. A GPS antenna 18 may be connected (optional) to a GPS navigation system inside the emulation unit via umbilical cord 19.

A compatible interface is defined on the pins of mating connector 16 to transfer data back-and-forth in accordance with the message set associated with the interface, For example, the LAR algorithms or source code imported from the smart-store are used to generate a 1760-compliant LAR message. For a 1760 aircraft, the emulation unit forwards the LAR message to the aircraft upon demand to generate and display the LAR to the aircrew. For a Maverick aircraft, the emulation unit translates the LAR message into a video signal and forwards the video signal for display to the aircrew to enable the full functionality of a 1760 store for training purposes. The emulation unit is software controlled and can be programmed to implement the interface requirements of any MIL-STD-1760 compatible store, to include stores that conform to the Universal Armament Interface. The emulation unit's hardware and software may be configured to implement any smart-store interface as defined by the store ICD.

In an embodiment for platforms that provide the 1760 interface, smart-store emulation unit 10 may be configured to independently provide 1760 smart-store training without the physical presence of the store. In this configuration, connector 16 is a 1760 connector that may be mated directly to the 1760 aircraft connector 14 or via interface cable 15.

Figure 1B:
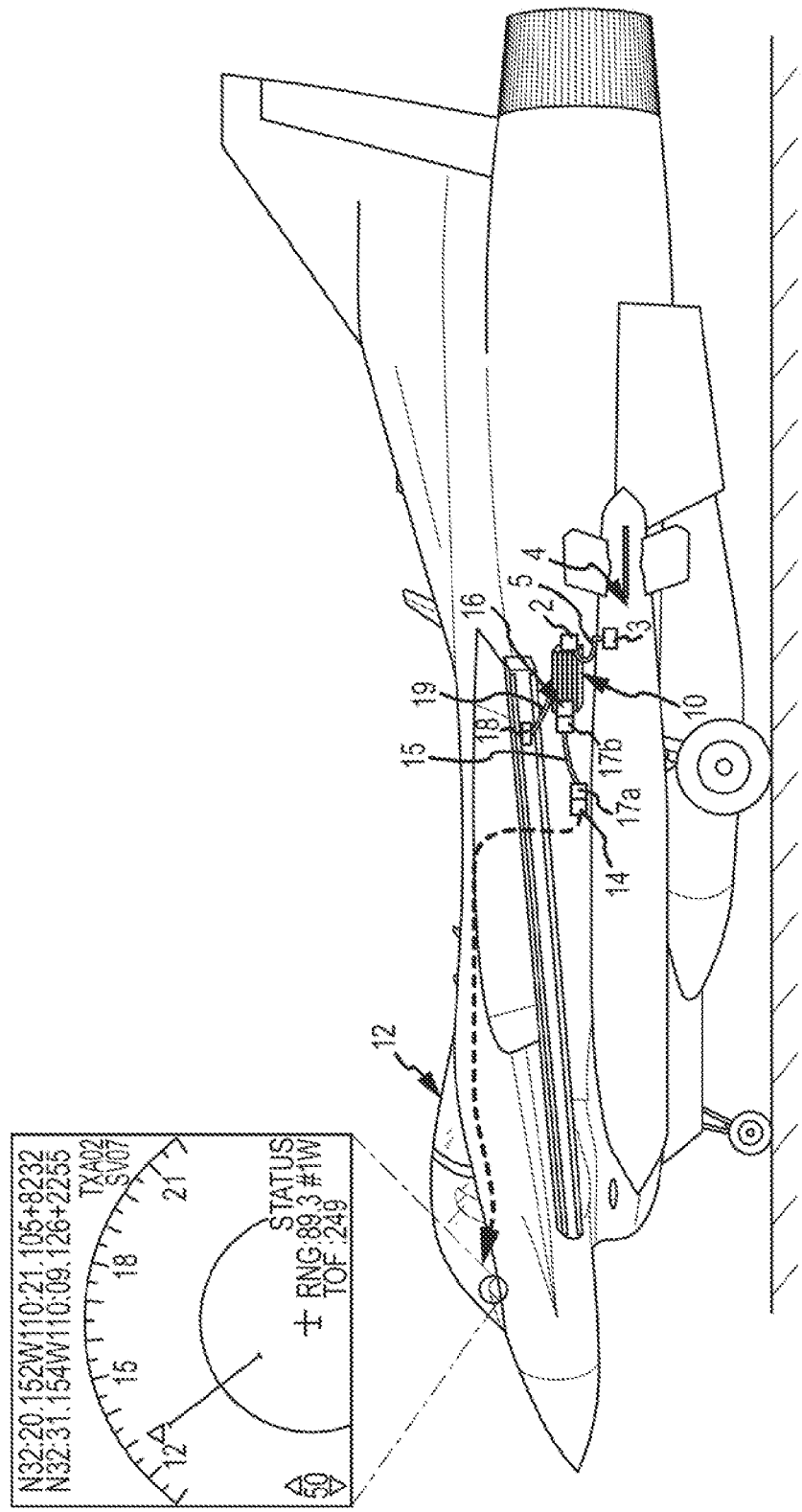

In an embodiment for platforms that only provide the AGM-65 Maverick interface, smart-store emulation unit 10 may be configured to independently provide 1760 smart-store training without the physical presence of the store, and 1760 smart-store control with the physical presence of the store. Connector 16 is a Maverick connector that may be mated directed to the Aircraft Maverick connector 14 or via interface cable 15. In a variation on this embodiment best shown in FIG. 1b, the emulation unit may provided with an additional 1760 mating connector 2 and 1760 digital interface for connection to a 1760 connector 3 on a smart-store 4 via an umbilical cable 5. In Maverick Training Mode, the store 4 is not physically present and the emulation unit emulates the 1760 store. In Maverick Control Mode, the store 4 is physically present and the emulation unit translates message traffic between the aircraft AGM-65 analog interface and the store 1760 digital interface. In a further variation on this embodiment, the unit's 1760 digital interface and software may be further modified so that the 1760 mating connector may be connected to a 1760 aircraft for a 1760 Training Mode without the physical presence of the store 4. This may be accomplished with either an interface cable 15 or by providing the emulation unit, with a second 1760 connector of opposite polarity coupled to the 1760 digital interface. In this configuration, Maverick connector 16 is not used.

Figure 2A:
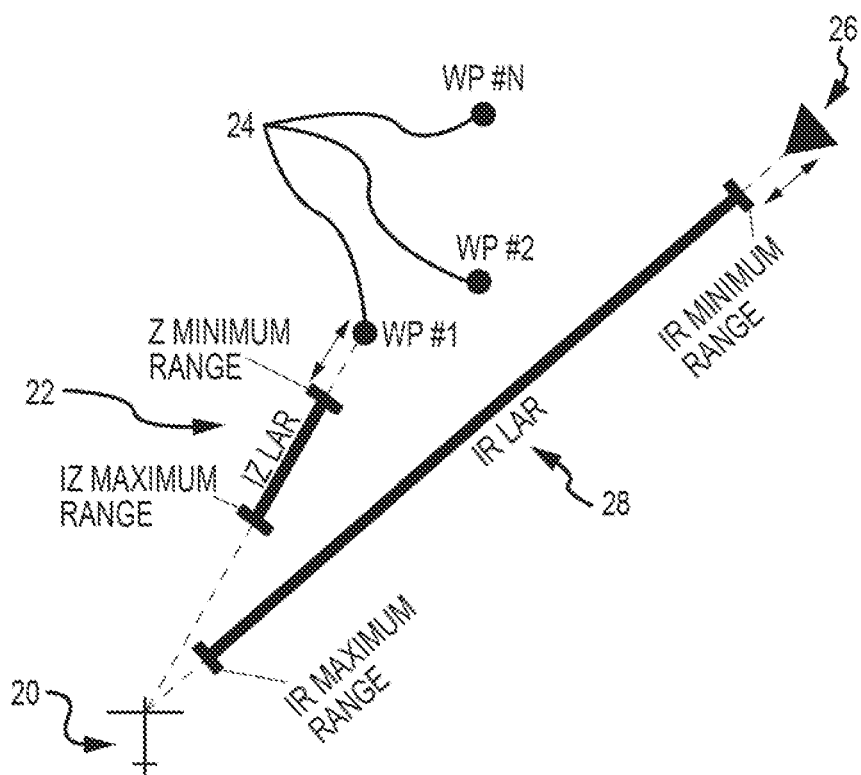
FIGS. 2a and 2b are different examples of a LAR for a smart-store.
Figure 2B:
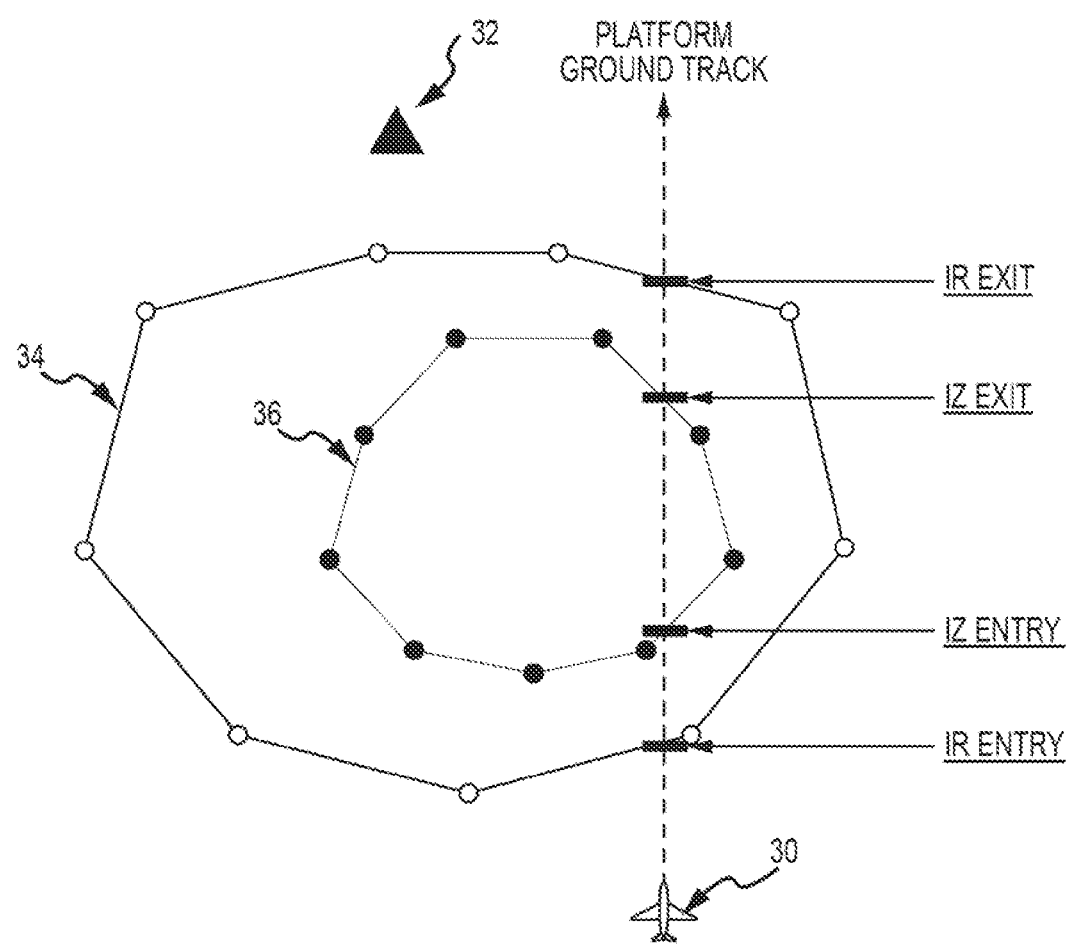

Referring now to FIGS. 2a and 2b, smart-stores such as bombs, missiles and smart projectiles compute and update their Launch Acceptability Region (LAR) to engage a target on the ground or in the air. The LAR defines a region of finite size, where "region" is either a line or an area, inside which a store can be successfully launched to reach a specified target. In the case of a weapon released from an aircraft, these launch conditions usually take into account variables like the range to the target, the speed, attitude and altitude of the aircraft, and the flyout capabilities of the weapon itself. The primary factors that typically limit the launch envelope of a store are its kinematic performance and seeker capabilities.

As shown in FIG. 2a, during captive carriage a store on aircraft 20 continuously computes two LARs: In-Zone (IZ) 22 with waypoints (WP) 24 to a target 26 and In-Range (IR) 28 to fly direct to target 26. In this example, the IR and IZ LARS are defined by four dimensions; IR Minimum Range, IR Maximum Range, 1Z Minimum Range, IZ Maximum Range. LAR dimensions are a real time function of target data and current aircraft position, velocity, and attitude. If the pilot gains altitude or increases airspeed, the LARs will grow in size. Turning towards WP#1 or target 26 will increase the IZ and IR LARs, respectively. The pilot must maneuver the aircraft to place the aircraft within either LAR. When launched the weapon will fly through all defined waypoints. When launched IR, the weapon will fly direct to the target.

As shown in FIG. 2b, a store on aircraft 30 continuously computes IZ and IR LARs to a target 32, as a real time function of target data and current aircraft position, velocity, and attitude. In this case sufficient information is presented to the aircraft to construct polygonal IR and IZ LAR footprints 34 and 36, respectively. The pilot must maneuver the aircraft to place the aircraft within either LAR.

The LAR is a critical piece of information to the pilot during combat operations, hence during training on the aircraft and smart-store. The smart-store emulation unit runs LAR algorithms, and source code if available, imported directly from the smart-store and thus generates the same message traffic and LAR results as a real-time function of target data and current aircraft position, velocity, and attitude. As the pilot maneuvers the aircraft, the emulation unit updates the LAR in precisely the same manner as a live smart-store.

Figure 3A:
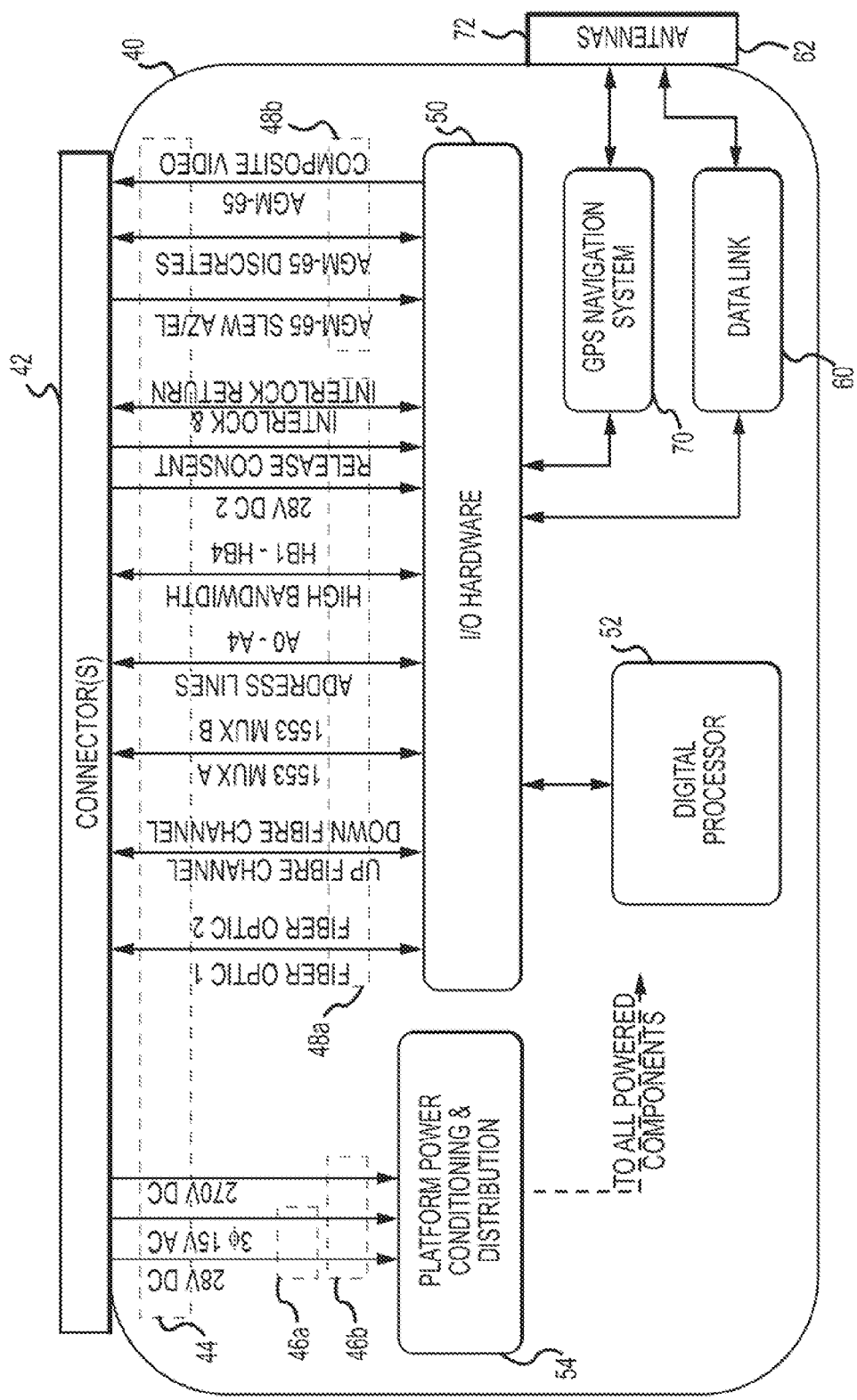
FIGS. 3a and 3b are hardware and software block diagrams of a smart-store emulation unit.
Figure 3B:
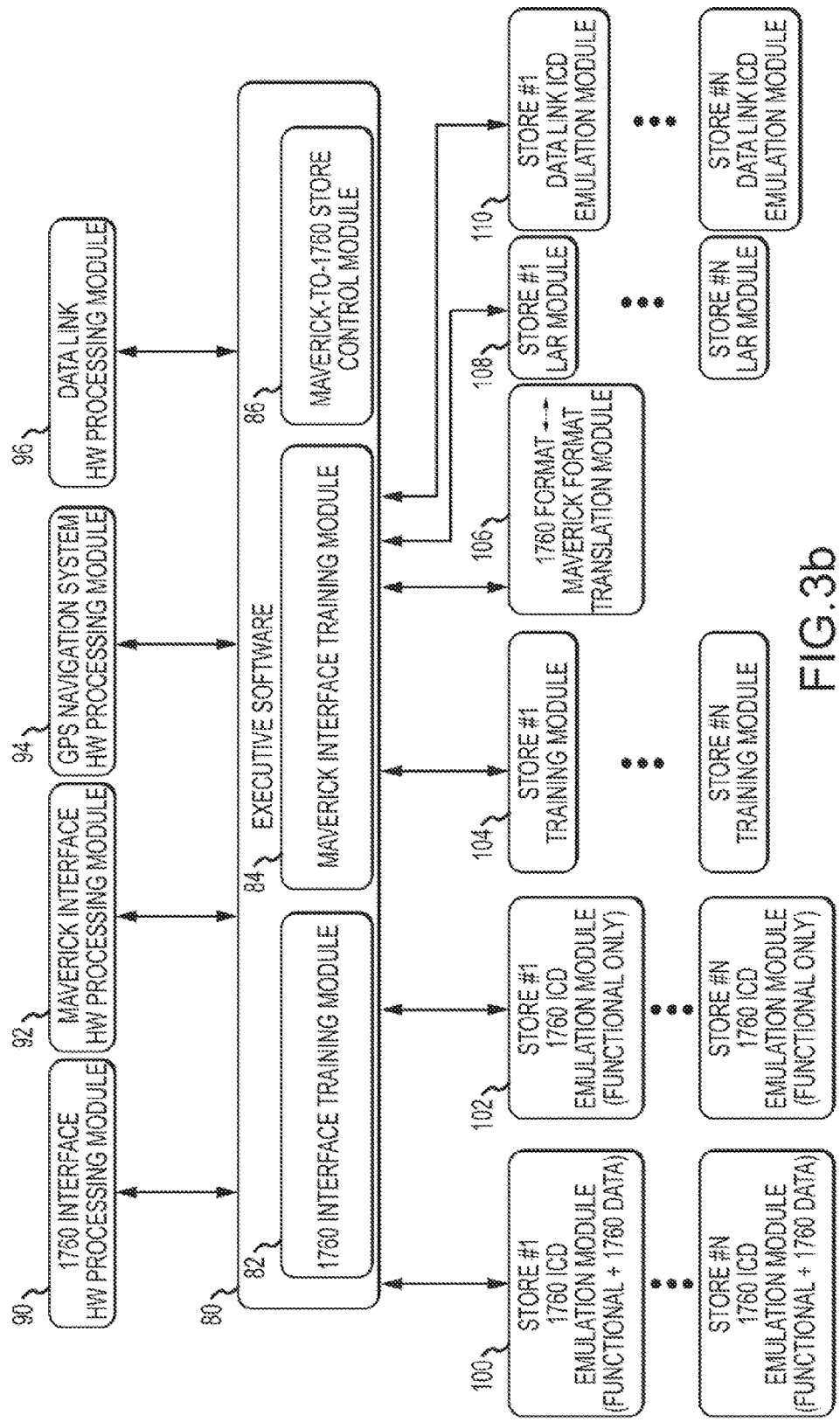
Figure 6A:
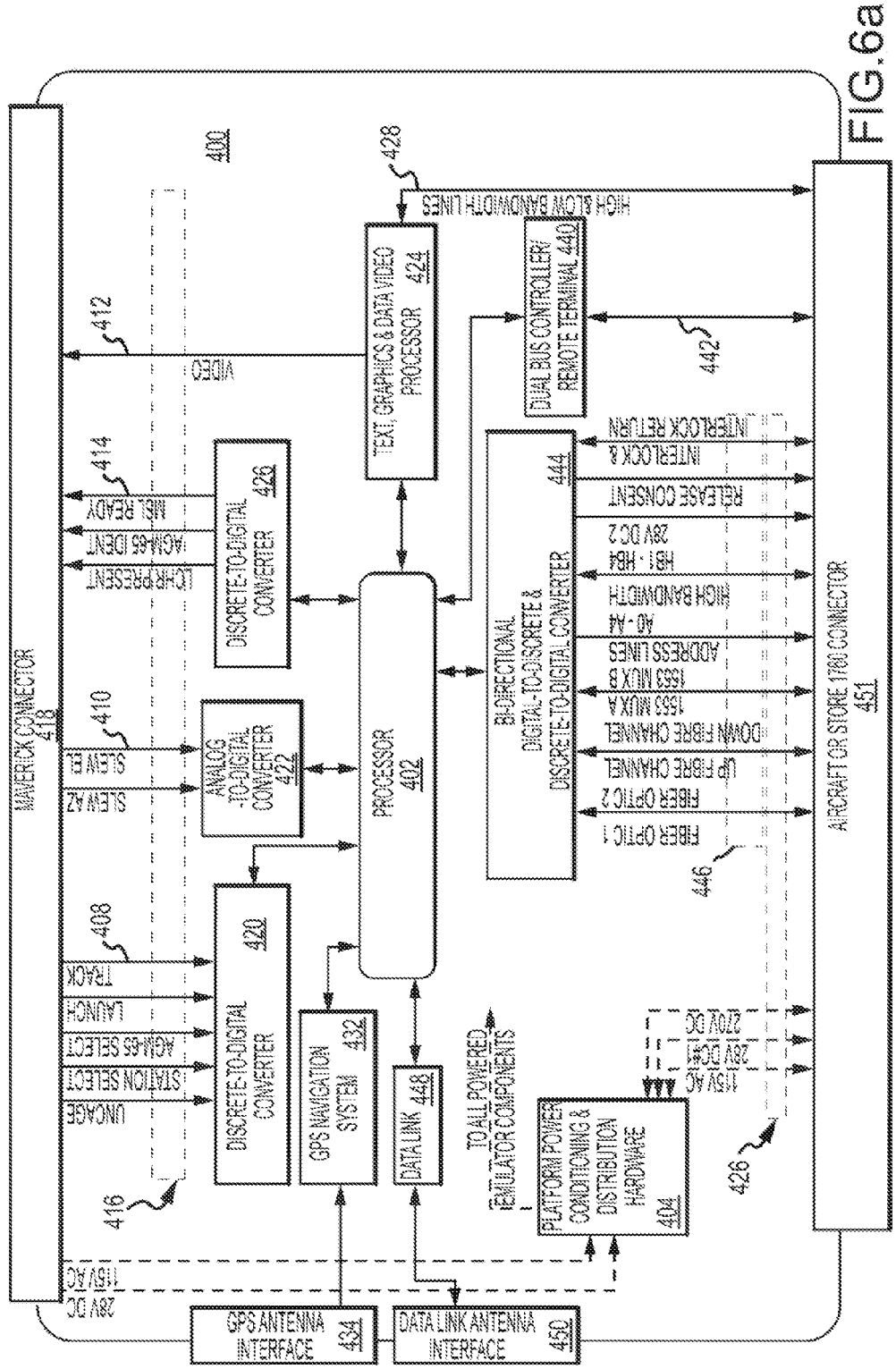

FIGS. 3a and 3b are hardware and software block diagrams capable of supporting different configurations of a smart-store emulation unit 40 for 1760 Aircraft-to-1760 store training (FIG. 4), AGM-65 ("Maverick") Aircraft-to-1760 store training (FIG. 5), AGM-65 ("Maverick") Aircraft-to-1760 store training and control (and 1760 Aircraft-to-1760 store training) (FIGS. 6a-6b). Some or all of the connectors, signals lines and hardware and software modules illustrated in these figures may be employed depending on the specific configuration of smart-store emulation unit 40.

Referring now to FIG. 3a, smart-store emulation unit 40 comprises a first mating 42 comprising a plurality of pins for connection to a platform connector and a first interface 44 including, power lines 46a and/or 46b and a plurality of signal lines 48a and/or 48h defined on the first connector pins. First interface 44 may include signal lines 48a for a MIL-STD- 1760 digital compatible interface or signal lines 48*b* for an AGM-65 analog compatible interface. I/O hardware 50 provides signal conversion and distribution between a digital processor 52 and the interface's signal lines. Digital processor 52 is configured to emulate the functional behavior of the smart-store and to transfer data in 1760 or AGM-65 compliant formats. Platform power hardware 54 provides power conditioning and distribution from power lines 46*a* or 46*b* to all powered components in the emulation unit.

A MIL-STD-1760 interface includes an aircraft 1760 digital interface on the aircraft and a store 1760 digital interface on the emulation unit that communicate via signals on signal lines 48*a*. 115V AC, 270V DC and 28V DC power, in whatever combination is provided by the aircraft to the store being emulated, are carried on power lines 46*b* to power the emulation unit. Release consent and interlock are carried on discrete lines from the aircraft interface to the emulation unit, an interlock return is returned from the emulation unit. Release consent allows the emulation unit to perform a "virtual" launch when commanded, and interlock and interlock return indicate whether the "store" is present. The digital signals are communicated via a high speed 1760-compatible data bus. Currently, most smart-stores employ the MIL-STD-1553 data bus that includes Mux A and Mux B channels and address lines. Future stores will replace or augment the 1553 data bus with Fibre Channel or fiber optic interfaces that provide much greater bandwidth than the 1553 data bus. The emulator unit supports any combination of the 1553 data bus, Fiber Optic 1 or 2, and the Fibre Channel digital interfaces. The emulation unit generates digital data such as store status, targeting status, and situational awareness including the LAR and other data defined in the store ICD, that is sent via the high speed data bus or Fibre Channel to the aircraft and displayed in the cockpit. The data is used by the aircraft computer to define various screens of text and graphics that the aircrew can navigate through to view store status, targeting information and to control deployment of the store. The aircraft sends digital data and controls over the data bus to the store to command built-in test (BIT), targeting and launch, for example. MIL-STD-1760 also specifies high and/or low bandwidth lines, which comprise general purpose transmission lines for analog or digital signals in the frequency range of 20 Hz to 1.6 GHz. These lines are supported by the emulator for those stores that require them.

An AGM-65 ("Maverick") interface includes an aircraft Maverick analog interface on the aircraft and a store Maverick analog interface on the emulation unit that communicate via signals on power lines 46*a* and signal lines 48*b* including discrete input signal lines ("high" or "low" only), variable analog input signal lines, a video output signal line and discrete output signal lines ("high" or "low" only) where input and output are referenced to the store. The aircraft interface provides 3-phase, 400 Hz, 115V AC and 28V DC power on power lines to power the emulation Unit. The aircraft interface provides discrete signals such as uncage, station select, AGM-65 select, launch, track, . . . on discrete input signal lines, which change state depending on how the aircrew manipulates the Maverick controls. The aircraft interface further provides two variable analog slew signals on analog input signal lines and a video channel output line.

The emulation unit sets the discrete signals to convince the Maverick aircraft software that a Maverick store is physically present, even though no store is physically present and the emulated store is a 1760, not a Maverick. The emulation unit generates a video signal in service of a 1760 store and transmits the video signal over the video channel to the cockpit. The emulator unit uses the video channel to provide the aircrew with a menu of textual options like Run BIT, Display LAR, Change Target Coordinates, etc. The aircrew can use existing Maverick controls (located on the HOTAS) to scroll up and down through the menu, select an item, modify it if required, and later return to the menu.

In an embodiment, the emulation unit may include a wireless data link 60 and antenna 62 for receiving data from a local or remote source prior to, during or after the emulated store launch. Smart-stores, for example JSOW, are now in production with such a data link.

In an embodiment for Maverick Aircraft-to-1760 store training, the emulation unit may include a GPS navigation system 70 and antenna 72 that can track GPS satellites and navigate while carried on the aircraft. Ordinarily the physical smart-store provides GPS capability. For a 1760 aircraft, the aircraft can provide the GPS navigation data, as specified by the store ICD, that is required by the emulation unit to compute and update the LAR.

In an embodiment for Maverick Aircraft-to-1760 store control, the emulation unit must act as a 1760 bus controller to the store, and so includes a second mating connector comprising a plurality of pins for connection to a 1760 connector, a second interface (1760 digital interface) defined on the second connector pins and I/O hardware for signal conversion and distribution between the digital processor and the second mating connector. For Maverick Training, the second mating connector and I/O hardware are not used. For Maverick Control, a live 1760 smart-store is connected to the second mating connector. The unit's second interface (1760 digital interface) and software may be further modified so that the second mating connector may be connected to a 1760 aircraft for a 1760 Training Mode without the physical presence of the store. In this configuration, the first mating connector 42 is not used. In this configuration, the 1760 digital interface is "bidirectional" in that the interface may act as a 1760-bus controller (aircraft's role) or a 1760 remote terminal (store's role) depending upon how the emulation unit is used.

Referring now to FIG. 3*b*, the smart-store emulation unit is configured to implement executive software 80. In a general configuration, executive software 80 may implement one of three modules: a 1760 Interface Training Module 82, a Maverick Interface Training Module 84 or a Maverick-to-1760 Store Control Module 86. These executive modules implement different combinations of hardware processing modules (e.g. 1760 Interface HW Processing Module 90, Maverick interface HW Processing Module 92, GPS navigation system HW Processing Module 94 and Data Link MW Processing Module 96) that allow the associated hardware and software emulation modules, e.g. Store 1760 ICD Emulation Modules (function+1760 message traffic) 100, Store 1760 ICD Emulation Modules (function only) 102, Store Training Modules 104, bidirectional 1760-to-Maverick Translation Module 106, Store LAR Modules 108 and Store Data Link ICD Emulation Modules 110 to emulate the functional behavior and store-compliant message traffic for "n" different 1760 stores, where "n" is defined by customer requirements.

Store 1760 ICD Emulation Modules (function+1760 message traffic) 100 use the ICD for a particular smart-store to precisely emulates the functional behavior and 1760-compliant message traffic of the smart-store as it receives and transmits data in response to operator or platform requests. These modules are used for store training or development testing on a 1760 aircraft, and for store training or stare control on a Maverick aircraft.

Bidirectional 1760-to-Maverick Translation Module 106 translates data flow between an Aircraft Maverick analog interface and a store 1760 digital interface, to support store training or store control on a Maverick aircraft.

Store 1760 ICD Emulation Modules (function only) 102 execute an Interface Control Document (ICD) emulation module to mimic only the functional behavior of the smart-store to transfer data in response to operator or platform requests. These modules are used in conjunction with the bidirectional 1760-to-Maverick Translation Module 106 to support smart-store training on a Maverick aircraft.

Store Training Modules 104 may be used to inject store errors (e.g. a simulated component failure) into the emulation, to record store, platform and pilot actions, and to score the performance of the pilot during training. These modules support training on both 1760 and Maverick aircraft.

Store LAR Modules 108 compute and update the smart-store's LAR in real time. The LAR module preferably runs LAR source code or algorithms imported from the smart-store and implemented in software so that the emulated LAR matches the LAR computed b a live store under all input conditions. The same Store LAR Module is used for either 1760 Aircraft or Maverick aircraft.

Store Data Link ICD Emulation Modules 110 emulate the functional behavior and radio frequency message traffic of the data link, and comply with the data link ICD that is specific to the store and data link.

In an embodiment, the digital processor is configured to execute the Store LAR module to compute and dynamically update the emulated store's LAR, to execute an ICD emulation module to mimic the functional behavior (and possibly the message traffic) of the smart-store in response to operator or platform requests and to provide the LAR to the platform. For each store, the ICD emulation module is programmed to implement the store's interface control document (ICD), which specifies the transmit and receive messages (typically 15-40 messages) required to correctly operate the store.

Figure 4:
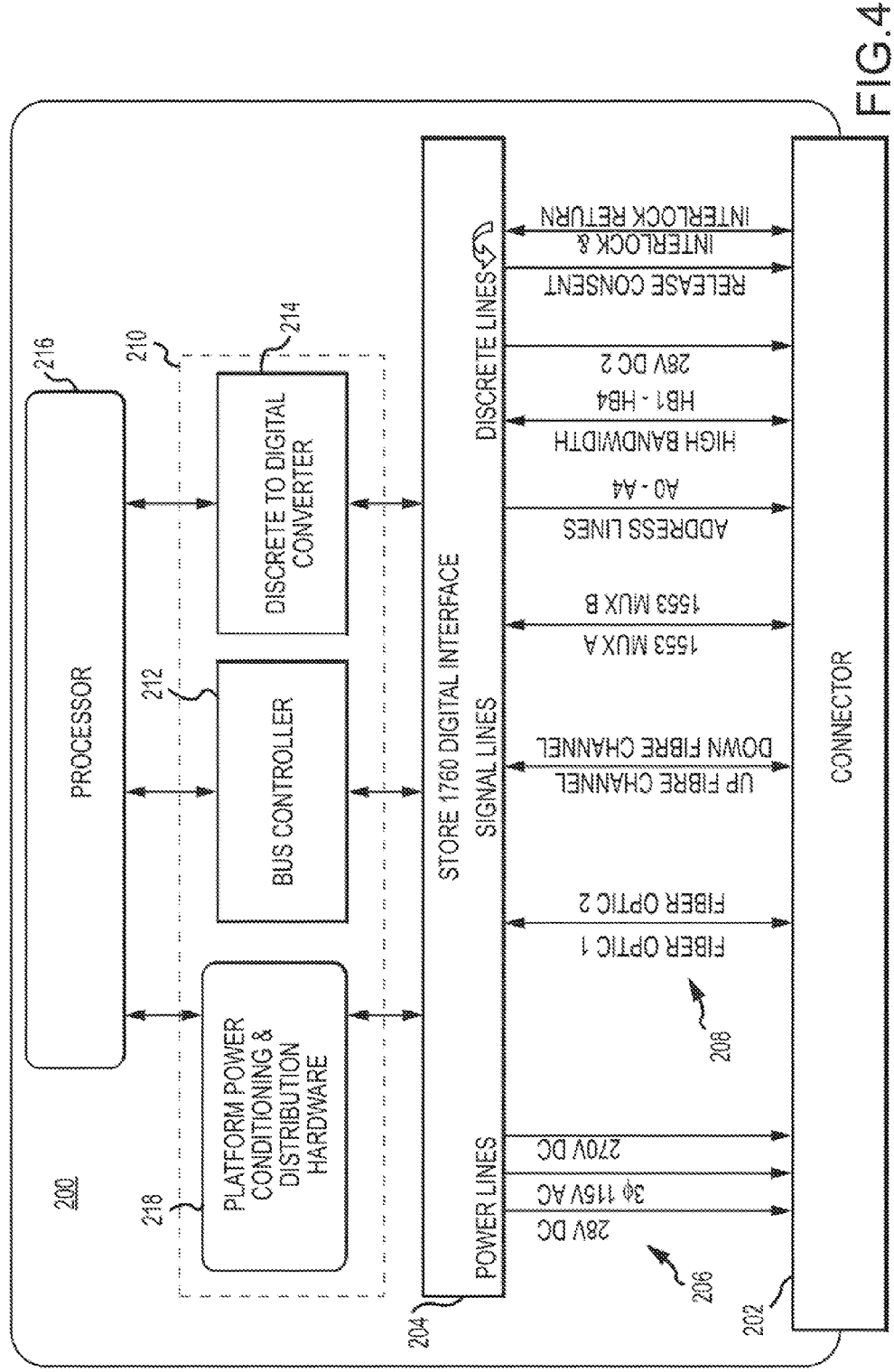
FIG. 4 is a hardware diagram of a smart-store emulation unit for use with a 1760 platform without the presence of a 1760 smart-store.

Referring now to FIG. 4, an embodiment of a smart-store emulation unit 200 is configured for 1760 Aircraft-to-1760 store training on-board a weapon platform in place of the physical presence of a smart-store. Smart-store emulation unit 200 composes a mating connector 202 comprising a plurality of pins for connection to a platform 1760 connector and a store 1760 digital interface 204 including power lines 206 and a plurality of signal lines 208 defined on the connector pins. The connection is typically made using a 1760 interface cable provided by the aircraft for the store being emulated. I/O hardware 210 including a bus controller 212 for 1553, Fibre Channel and fiber optical digital data buses and a discrete-to-digital convener 214 provides signal conversion and distribution between a digital processor 216 and store 1760 digital interface 204 signal lines. Digital processor 216 is configured to emulate the functional behavior of the smart-store and to transfer data in 1760-compliant message traffic by executing the Store 1760 ICD Emulation module 100 and the LAR Module 108 for a particular smart-store, and to control the I/O hardware 210 by executing the 1760 Interface HW Processing Module 90. Platform power conditioning and distribution hardware 218 provides power conditioning and distribution from power lines 206 to all powered components in the emulation unit.

Referring now to FIG. 5, an embodiment of a smart-store emulation unit 300 is configured for Maverick Aircraft-to-1760 store training on-board a weapon platform in place of the physical presence of a 1760 smart-store. Smart-store emulation unit 300 comprises an AGM-65 mating connector 302 comprising a plurality of pins for connection to a platform AGM-65 connector and a store AGM-65 analog interface 304 including power lines 306 and a plurality of signal lines 308 defined on the connector pins. For Maverick aircraft, the connection between aircraft and emulator is typically made using an interface cable provided with the emulator. I/O hardware 309 provides signal conversion and distribution between a digital processor 310 and store AGM-65 interface 304. Digital processor 310 is configured to emulate the functional behavior of the smart-store and to transfer data in AGM-65 compliant format by executing the Store 1760 ICD Emulation module 102 and the LAR Module 108 for a particular smart-store, and the Translation Module 106, and to control the I/O hardware 309 by executing the Maverick Interface HW Processing Module 92. Platform power hardware 311 provides power conditioning and distribution from power lines 306 to all powered components in the emulation unit.

I/O hardware 309 includes a Discrete-to-Digital Convertor 312, an Analog-to-Digital (A/D) Converter 314, a text, graphics data video processor 316, and a Digital-to-Discrete Converter 318. The Discrete-to-Digital Convertor 312 allows the Digital Processor 310 to determine the high/low state of each discrete input signal on signal lines 308. These signals are responsive to aircraft software and to aircrew selections from menus of options generated for display by the emulation unit. These options allow the aircrew to control all aspects of store operations as defined in the store ICD, from displaying the LAR to changing target coordinates to commanding launch. The A/D Converter 314 provides the Digital Processor with a digital representation of the analog voltage level of the two slew commands on signal lines 308, necessary to correctly manipulate the aircrew menu display, e.g. scroll the menu or to increment or decrement the value of selected data fields on the menu. The video processor 316 provides the digital-to-video conversion required to drive the Maverick cockpit display including the LAR. Depending, on what data the Digital Processor supplies to the video processor, both alphanumeric text and graphics can be displayed, separately or together. The Digital-to-Discrete Convertor 318 allows the Digital Processor to correctly set the discrete output signals on signal lines that convey Maverick status (e.g. store is attached, store is ready for launch) to the aircraft software.

As described previously, the emulation unit also includes GPS navigation system 322 that is connected to a OPS antenna via a GPS antenna interface 324. Most stores have an on-board GPS antenna and navigation system that can track GPS satellites and navigate while carried on the aircraft. Real time GPS-quality navigation data is used by the store to compute its LAR, so the emulation unit likewise requires real time GPS-quality navigation data. The Maverick weapon does not require or receive GPS navigation data from its aircraft, so for operation as a training device on Maverick aircraft, the emulation unit must be provided with us own GPS navigation system. The navigation system is connected to a GPS antenna, which is typically flush-mounted on a nearby aircraft access panel located on top of the wing or at the front or rear of the store pylon where the emulation unit is installed. The GPS navigation system may pass GPS navigation data to the emulation unit processor, which in turn computes the LAR that is then returned as part of the smart-store situational awareness data.

Referring now to FIGS. 6a and 6b, an embodiment of a multi-purpose smart-store emulation unit 400 is configured for Maverick Aircraft-to-1760 store training or control or 1760 Aircraft-to-1760 training. All hardware control, software and emulation modules illustrated in FIG. 3b reside within a digital processor 402. Note that this block diagram does not describe the physical layout of the electronics. An functions shown may be consolidated in a single device. As shown, any combination of 115V AC, 270 VDC and 28 VDC operating power can be supplied from the aircraft and conditioned and distributed via platform power hardware 404 to power both the emulation unit 400 and a smart-store if attached.

On the Maverick side of the diagram, digital processor 402 manipulates signal lines 408, 410, 412 and 414 at store Maverick analog interface 416 defined on the pins of a mating Maverick connector 418 to control a Discrete-to-Digital Convertor 420, an Analog-to-Digital (A/D) Converter 422, a text, graphics & data video processor 424, and a Digital-to-Discrete Converter 426, respectively. The Discrete-to-Digital Convertor 420 allows the processor 402 to determine the high/low state of each discrete input signal on signal lines 408. These signals are responsive to aircraft software and to aircrew selections from menus of options generated for display by the emulation unit. These options allow the aircrew to control all aspects of store operations as defined in the store ICD, from displaying the LAR to changing target coordinates to commanding launch. The A/D Converter 422 provides the processor with a digital representation of the analog voltage level of the two slew commands on signal lines 410, necessary to correctly manipulate the aircrew menu display e.g. scroll the menu or to increment or decrement the value of selected data fields on the menu. The video processor 424 provides the digital-to-video conversion required to drive the Maverick cockpit display including the LAR. Depending on what data the processor supplies to the video processor, text, graphics and data can be displayed, separately or together. Next generation stores may be capable of generating or receiving data on high and/or low bandwidth lines 428 provided for in the 1760 interface. The processor would be configured to recognize these stores and would use the video processor 424 to access and correctly manipulate this data. The Digital-to-Discrete Convertor 426 allows the processor to correctly set the discrete output signals on signal lines 414 that convey Maverick status (e.g. store is attached and operational status) to the aircraft software. GPS navigation system 432 that is connected to a GPS antenna via a GPS antenna interface 434 supplies UPS navigation signals to the emulation unit.

On the 1760 side of the diagram, the emulation unit is configurable as either a store 1760 interface (1760 remote terminal) when functioning as an emulation unit for a 1760 aircraft or as an aircraft 1760 interface (1760 bus controller) when functioning as a control unit for a 1760 smart-store. A 1760 digital interface 426 is defined on the pins of a 1760 connector 451. To facilitate dual purposing of the unit, a connector adapter or interface cable may be required to connect 1760 connector 451 to the mating 1760 connector on a 1760 aircraft, or two separate 1760 connectors, one male and one female, may be provided.

Processor 402 controls a MIL-STD-1760 compliant dual serial data bus controller/remote terminal 440 for digital communications with the 1760 store/aircraft over signal lines 442. MIL-STD-1553, fiber optic, and Fibre Channel communication are supported. For each store, the emulation unit is programmed to implement the store's interface control document (ICD), which specifies the transmit and receive messages (typically 15-40 messages) required to correctly operate the store. During launch (emulated or real), the processor controls a bidirectional digital-to-discrete converter 444 over signal lines 446 to produce the 1760 Discrete Signals e.g. release consent and 28V DC#2, to correctly implement the store's ICD-specified launch protocol. The emulation unit may include a wireless data link 448 and antenna interface 450 for exchanging RF data with a local or remote source prior to, during or after the store launch. Certain smart-store designs have entered production with such a data link.

Referring now to FIG. 6b, emulation unit 400 shown in FIG. 6a may be configured to execute any one of three modes: 1760 Interface Training Mode, Maverick Interface Training Mode or Maverick-to-1760 Control Mode. The unit's processor runs executive software to implement one of the three modes using the modules defined in FIG. 3b. The Executive software may either set the correct mode automatically by detecting the hardware interface connections or manually by allowing the aircrew to select the Mode from a menu.

In an embodiment, after power up and initialization (step 500), the processor determines if the aircraft interface is 1760 (step 502). If yes, the processor implements the 1760 Interface Training Module 82. Module 82 runs LAR Module 108 for a particular store to generate the LAR message, the Store 1760 ICD Emulation Module 100 for that particular store to mimic the functional behavior and message traffic of the smart-store in response to operator or platform requests and 1760 Interface HW processing 90 to transfer the data (including the LAR) via the 1760 interface to the 1760 aircraft 504. Module 82 may also run Data Link HW Processing Module 96 and Store Data Link ICD Emulation Module 110 to control data link 448. Module 82 may also run Store Training Module 104 to inject store errors into the emulation, to record aircraft, unit and pilot actions, and to score pilot performance.

If a 1760 aircraft is not present, the processor determines if a smart-store is physically present (step 506). If no, the processor implements the Maverick Interface Training Module 84. Module 84 receives GPS navigation data from UPS navigation system HW Processing Module 94 and runs LAR Module 108 for a particular store to generate the LAR message, the Store 1760 ICD Emulation 102 for that particular store to mimic the functional behavior of the smart-store in response to operator or platform requests, the Translation Module 106 to translate between the Maverick and 1760 data formats and Maverick interface HW Processing Module 92 to transfer the data (including the LAR video) via the Maverick interface to the Maverick aircraft 508. Module 84 may also run Store Training Module 104 to inject store errors into the emulation, to record aircraft, unit and pilot actions, and to score pilot performance.

If a smart-store is physically present (step 506), the processor implements Maverick-to-1760 Store Control Module 86 to control the 1760 smart-store from the Maverick aircraft. Module 86 runs Maverick Interface MW Processing Module 92, 1760 Format-to-Maverick Format Translation Module 106, Store 1760 ICD Emulation Module 100 and 1760 Interface HW Processing module 90 to communicate data back and forth between Maverick aircraft 508 and 1760 smart-store 510 via the Maverick interface.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A smart-store emulation unit for use on-board an AGM-65 weapon platform comprising a platform connector on which a platform AGM-65 analog interface is defined, said unit comprising:
   a first mating connector configured for connection to the platform connector, said first mating connector comprising a plurality of pins;
   an AGM-65 analog interface including power lines and a plurality of signal lines defined on the first connector pins;
   a second mating connector comprising a plurality of pins;

a MIL-STD-1760 digital interface including power lines and a plurality of signal lines defined on the second connector pins;
a bidirectional 1760-to-AGM-65 digital-to-analog translation module to translate between AGM-65 and 1760;
a Launch Acceptability Region (LAR) module configured to compute and dynamically update a 1760 store's LAR in the absence of a connected smart-store;
a first Interface Control Document (ICD) emulation module to mimic the functional behavior of a 1760 smart-store in response to operator or platform requests and to provide the LAR to the platform;
a GPS navigation system to provide coordinates and other navigation data to the LAR module;
a digital processor configured to determine whether the second matting connector is connected or unconnected, if said second mating connector is connected to execute an AGM-65 Control Mode, and if said second mating connector is unconnected to execute an AGM-65 Training mode,
a first I/O hardware between the digital processor and the AGM-65 analog interface for signal conversion and distribution between the digital processor and the AGM-65 analog interface power lines and signal lines; and
a second I/O hardware between the digital processor and the MIL-STD-1760 digital interface for signal conversion and distribution between the digital processor and the MIL-STD-1760 digital interface power lines and signal lines;
wherein in said AGM-65 Control Mode said second mating connector is connected to a live 1760 smart-store comprising a MIL-STD-1760 digital interface, said digital processor executes the translation module to control data transfer between the AGM-65 platform and the 1760 smart-store to control the launch of the live 1760 smart-store; and
wherein in said AGM-65 Training Mode said second mating connector is unconnected, said digital processor executes the LAR module, first ICD emulation module and translation module to emulate the 1760 smart-store for the AGM-65 platform.

2. The smart-store emulation unit of claim 1, wherein the LAR module generates the same LAR message traffic and same LAR results as the smart-store.

3. The smart-store emulation unit of claim 1, wherein the platform comprises an aircraft and the smart-store is a weapon launched from the aircraft.

4. The smart-store emulation unit of claim 1, wherein the digital processor is configured to execute a training module that emulates store errors to send error messages to the operator or platform.

5. The smart-store emulation unit of claim 4, wherein the training module records platform, operator and emulation unit actions and scores operator performance.

6. The smart-store emulation unit of claim 1, wherein said 1760 ICD emulation module supports only the functional behavior of the smart-store.

7. The smart-store emulation unit of claim 1, wherein the unit includes different LAR modules and first and second ICD emulation modules for different smart-stores, each said LAR module implementing LAR source code or algorithms imported from the different smart-store, each said LAR module generating the same LAR message traffic as the different smart-store.

8. A smart-store emulation unit for use on-board a weapon platform in place of the physical presence of a MIL-STD-1760 smart-store, wherein said weapon platform comprises either a platform AGM-65 analog interface or a platform MIL-STD-1760 digital interface defined on a platform connector, said emulation unit comprising:
a first mating connector comprising a plurality of pins;
an AGM-65 analog interface including power lines and a plurality of signal lines defined on the first connector pins;
a second mating connector comprising a plurality of pins;
a MIL-STD-1760 digital interface including power lines and a plurality of signal lines defined on the second connector pins;
a bidirectional 1760-to-AGM-65 digital-to-analog translation module to translate between AGM-65 and 1760;
a Launch Acceptability Region (LAR) module configured to compute and dynamically update a 1760 store's LAR_in the absence of a connected smart-store;
a first Interface Control Document (ICD) emulation module to mimic the functional behavior of a 1760 smart-store in response to operator or platform requests and to provide the LAR to the platform;
a GPS navigation system to provide coordinates and other navigation data to the LAR module;
a second Interface Control Document (ICD) emulation module to mimic the functional behavior of a 1760 smart-store and 1760-compliant message traffic of the smart-store in response to operator or platform requests and to provide the LAR to the platform;
a digital processor configured to determine whether the first or the second mating connector is connected to the platform connector, if said first mating connector is connected to execute an AGM-65 Training mode, and if said second mating connector is connected to execute a 1760 Training mode,
a first I/O hardware between the digital processor and the AGM-65 analog interface for signal conversion and distribution between the digital processor and the AGM-65 analog interface power lines and signal lines; and
a second I/O hardware between the digital processor and the MIL-STD-1760 digital interface for bi-directional signal conversion and distribution between the digital processor and the MIL-STD-1760 digital interface power lines and signal lines;
wherein in said AGM-65 Training Mode said digital processor executes the LAR module, first ICD emulation module and translation module to emulate the 1760 smart-store for the AGM-65 platform; and
wherein in said 1760 Training Mode said digital processor executes the LAR module and second ICD emulation module to emulate the 1760 smart-store for the 1760 platform.

* * * * *